US006008464A

United States Patent [19]

Donnart et al.

[11] Patent Number: 6,008,464

[45] Date of Patent: Dec. 28, 1999

[54] SYSTEM FOR REGULATING AND CONTROLLING PLASMA TORCH

[75] Inventors: Philippe Donnart, Le Barp; Daniel Loubet, Saint Aubin de Medoc, both of France

[73] Assignee: Aerospatiale Societe Nationale Industrielle, Paris Cedex, France

[21] Appl. No.: 09/066,934

[22] Filed: Apr. 28, 1998

[30] Foreign Application Priority Data

May 14, 1997 [FR] France .................................. 97 05921

[51] Int. Cl.[6] ....................................................... B23K 9/00

[52] U.S. Cl. ................................ 219/121.54; 219/121.48

[58] Field of Search .............................. 219/121.54, 137, 219/121.51, 121.48; 364/477

[56] References Cited

U.S. PATENT DOCUMENTS

| | | | |
|---|---|---|---|
| 3,646,311 | 2/1972 | Cameron et al. | 219/137 |
| 4,122,327 | 10/1978 | Vogts et al. . | |
| 4,692,584 | 9/1987 | Caneer, Jr. | 219/121 PU |
| 4,916,283 | 4/1990 | Nagasaka et al. | 219/121.51 |
| 5,245,546 | 9/1993 | Iceland . | |
| 5,294,773 | 3/1994 | Lambert . | |
| 5,688,417 | 11/1997 | Cadre et al. | 219/121.52 |
| 5,847,354 | 12/1998 | Daniel | 219/121.54 |

FOREIGN PATENT DOCUMENTS 0 565 423 10/1993 European Pat. Off. .

OTHER PUBLICATIONS

Patent Abstracts of Japan, vol. 096, No. 011, Nov. 29, 1996, JP 08 185 972, Jul. 16, 1996.

Patent Abstracts of Japan, vol. 016, No. 034 (M–1204), Jan. 28, 1992, JP 03 243 254, Oct. 30, 1991.

*Primary Examiner*—Philip H. Leung
*Assistant Examiner*—Quang Van
*Attorney, Agent, or Firm*—Oblon, Spivak, McClelland, Maier & Neustadt, P.C.

[57] ABSTRACT

A plasma torch control system includes a data storage device that stores optimum arc voltages as a function of real torch powers supplied to the torch, wherein an optimum arc voltage is a voltage for which the torch has maximum torch efficiency for a real torch power, a ramping regulator that ramps the real torch power to a power reference value and keeps a real arc voltage of the torch within an error margin of an optimum arc voltage stored in the data storage device, and a stabilizing regulator that stabilizes the real torch power around the power reference value and keeps the real arc voltage within an error margin of an optimum arc voltage stored in the data storage device.

14 Claims, 12 Drawing Sheets

SYSTEM FOR REGULATING AND CONTROLLING PLASMA TORCH

TECHNICAL FIELD AND PRIOR ART

The invention relates to the field of plasma torches and in particular the regulation and control of a plasma torch.

A plasma torch is a high power electrical apparatus supplying a gas, ionized at high temperature (>3500° C.). It has industrial applications in fields requiring very high temperatures, such as:

the environment, for the destruction or vitrification of dangerous waste, chemistry, for the synthesis of certain products, the iron and steel and metallurgical industries, for the heating of blast and cupola furnaces.

Although the operation of a torch can be considered in isolation, it is generally associated with an industrial process to which it supplies the thermal energy and with which it exchanges control data.

The operation of a plasma torch then requires the simultaneous implementation of several ancillary systems, controlled by an automatic system ensuring the checking/control of the torch system.

Thus, the present invention also relates to a plasma torch system (torch system), i.e. having a torch and ancillary systems associated therewith to enable it to fulfil its mission.

The design of the automatic system of the torch system is dependent on its use conditions in the process. The torch can e.g. be partly introduced into a furnace raised to a high temperature and with a corrosive environment. It is then internally and externally cooled.

The torch system must have a long operating cycle with great reliability and an adequate, continuous operating time so as not to disturb or prematurely stop the industrial process.

However, being a high technology system, the implementation of a plasma torch must remain simple and usable by operators not having specific knowledge. EP-565 423 discloses a plasma torch control system.

In this prior art system, the arc voltage and arc intensity are measured continuously. Checking or control means make it possible to control the arc current and the flow rate of the plasma forming gas. Finally, a regulating valve of the pneumatic control type is controlled by an electropneumatic positioner associated with a pneumatic flow amplifier. This makes it possible to render compatible the opening and closing variations of the valve with reference value variations supplied by the checking or control means.

Such a system for the control of a torch is complex and requires the implementation of relatively fixed equipments. In particular, the valve described in said document has a relatively precise, mechanical operation. In addition, said checking system is fixed for each torch and each application. It is possible to modify the reference values used, but a regulating system designed for a given torch and a given application is not compatible with another, different torch, or another application.

Moreover, such a system does not optimize the operation of the torch. EP-565 423 gives no information on the manner of obtaining a reference power, or the problem of stabilizing the power of the torch when a power reference value is reached.

This document also fails to deal with the problem of external interference or disturbances, such as variations in the humidity of the plasma forming gas or the state of wear of the electrodes.

However, such disturbances can arise, particularly after a relatively long torch use period. In this case, the real power supplied by the torch is affected, which is prejudicial to its satisfactory operation, as well as maintaining the process for which it is used.

DESCRIPTION OF THE INVENTION

Thus, the problem arises of finding another plasma torch regulating system having a more flexible use than that described hereinbefore.

The problem also arises of implementing a plasma torch regulating or control system not requiring the use of a pneumatic control valve with positioner and flow amplifier.

The problem also arises of finding a regulating system compatible with an optimum, preestablished torch operation.

Finally, the problem arises of finding an operation of the torch which is not greatly disturbed by variations in the composition of the plasma forming gas or by wear to the electrodes.

The invention proposes a novel system for regulating a plasma torch making it possible to solve the aforementioned problems.

The invention relates to a system for controlling a plasma torch having:

means for storing a curve of the arc voltage of the torch called the optimum voltage curve, as a function of the real electric power supplied to the torch, means for controlling a regulation of the power of the torch and operating:

according to first operating conditions, known as ramp conditions, so that the real power reaches a value known as the power reference value, with an arc voltage which evolves, to within a margin of error, with the optimum power, or which follows, to within a margin of error, the optimum voltage, according to second conditions, called permanent conditions, in order to stabilize the real power around the reference value, with an arc voltage equal, to within a margin of error, to the optimum voltage.

The term optimum voltage is understood to mean a voltage previously chosen by the designer. For a given power, such an optimum voltage can be the voltage corresponding to a maximum efficiency of the torch and/or to a minimum wear of the electrodes.

Such a system does not require a mechanical regulation of the air flow. In addition, such a system has no problem with regards to the speed or acceleration of the response of an element to a control from the checking or control means.

Finally, such a system is compatible with any plasma torch system, because for each torch it only requires the knowledge of the function determining an optimum operation of the torch.

When operating under ramp conditions, the regulating means make it possible to reach the power reference value. When operating under permanent conditions, the regulating means make it possible to stabilize the power of the ramp.

Such a system also offers the following advantage with respect to external disturbances (variations in the resistivity or pressure of the plasma forming gas, which is in direct contact with the electrodes) which might affect the operation of a poorly regulated torch. The regulating system according to the invention is such that a deficiency of said plasma forming gas or gas supply circuit does not affect the torch system. Thus, a variation in the resistivity, or any other disturbance, produces a variation in the voltage, which is then brought to its optimum value.

Means can be provided for determining, as a function of the difference between the real electric power value and the reference power value how the means for controlling the regulation must operate.

The control of the regulation can act on arc current and/or air flow values, in order to modify the arc voltage and real power values.

Such a system can also have means for modifying the reference power value when the regulating means operate under permanent conditions. Thus, a system exists able to operate in an optimum manner, no matter what reference value modifications are imposed by the operator and without having to stop the torch.

In addition, the power regulation can be associated with a temperature regulation of the environment in which the torch is operating. The means for controlling the power regulation can then also be used as means for controlling the temperature regulation.

Thus, the invention also relates to a plasma torch regulating system having two nested loops, namely a first, power regulating loop and a second, temperature regulating loop.

Preferably, the means for controlling the temperature regulation incorporate means for producing a torch power variation control signal as a function of an operating temperature $T_f$ of the device in which is placed the torch and the inertia ($C_p$) of said device.

The invention also provides various means for monitoring the system constituted by the torch and its environment. Thus, the torch can be coupled to a very expensive apparatus, such as e.g. a blast or cupola furnace or a waste treatment furnace. A fault in the ancillary systems of the torch can have disastrous consequences, not only with respect to the torch, but also with respect to the downstream apparatus. A very close monitoring of the various ancillary systems permitting the torch to operate is consequently sometimes necessary.

To this end, the torch control system can incorporate means making it possible to supply to an operator interface alert signals or an operation stop signal if faults occur in the fluid supply means or electric power supply means of the plasma torch. Preferably, a stop signal is transmitted prior to an alert signal.

BRIEF DESCRIPTION OF THE DRAWINGS

The features and advantages of the invention will become more apparent from the following description relating to embodiments given in an explanatory and non-limitative manner, with reference to the attached drawings, wherein show.

DETAILED DESCRIPTION OF EMBODIMENTS OF THE INVENTION

Figure 1:
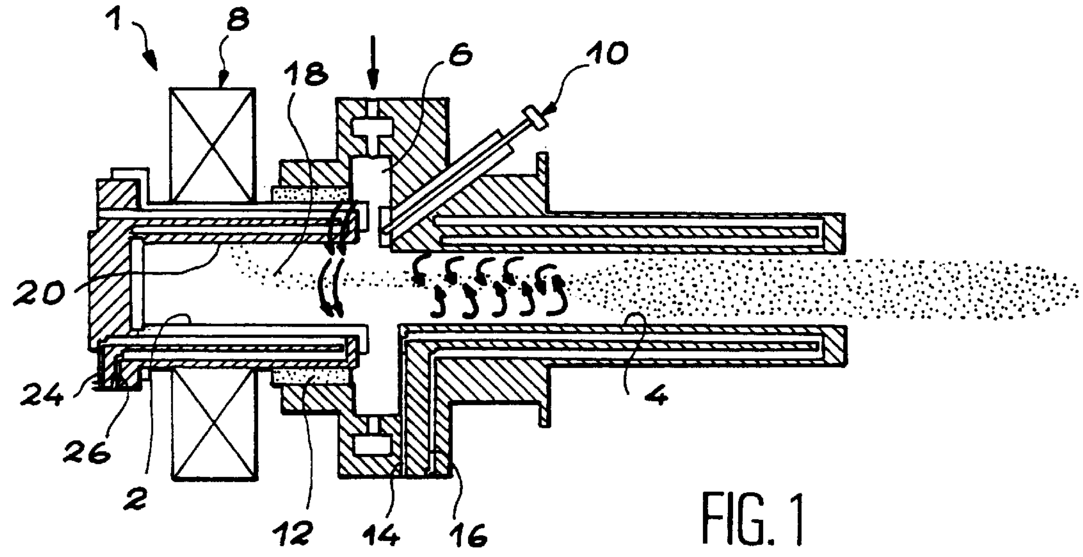
FIG. 1 Diagrammatically a plasma torch.

A plasma torch usable within the scope of the present invention has the following components, illustrated in FIG. 1:

- two tubular electrodes 2, 4 (upstream and downstream) between which an electrical arc 18 is established,
- a vortex gas injection chamber 6 between the two electrodes 2 and 4,
- a field coil 8 placed around the upstream electrode 2 and intended to rotate the arc foot or root 20,
- an arc ignition device 10 (starter), e.g. described in FR-A-89 14677,
- ancillary cooling, connection, protection and maintenance equipments described in greater detail hereinafter.

During torch operation, the plasma forming air is injected by the injection chamber 6 located between the electrodes and is discharged through the downstream electrode 4. The electrical arc is then created by establishing the arc current and by the synchronized recoil or moving back of the starter 10, which previously maintained in short-circuit the upstream electrode 2 and downstream electrode 4.

On starting, said short-circuit arc has the effect of locally overheating the plasma forming air and making it electrically conductive. Thus, the electrical arc becomes a self-maintained phenomenon.

The air, raised to a very high temperature by the electrical arc, constitutes the plasma jet projected to the outside of the torch.

Due to the high temperatures prevailing at the arc roots 20, the electrodes are cooled by a circulation of water, whose inlet and outlet are indicated in FIG. 1 by references 14 and 16 for the downstream electrode 4 and 24 and 26 for the upstream electrode 2. This water is demineralized in order to maintain an adequate electrical insulation in the torch.

The life of the torch is improved by rotating and displacing in longitudinal manner the upstream and downstream arc roots in the electrodes in order to prevent the melting of material and the distribution of material wear over the largest possible surface. This action is effected in the upstream electrode by means of the field coil 8, which can be supplied in series with the direct current of the arc or can have a separate power supply. In the downstream electrode, the arc root is rotated by the whirling effect of the vortex injected air.

Figure 2:
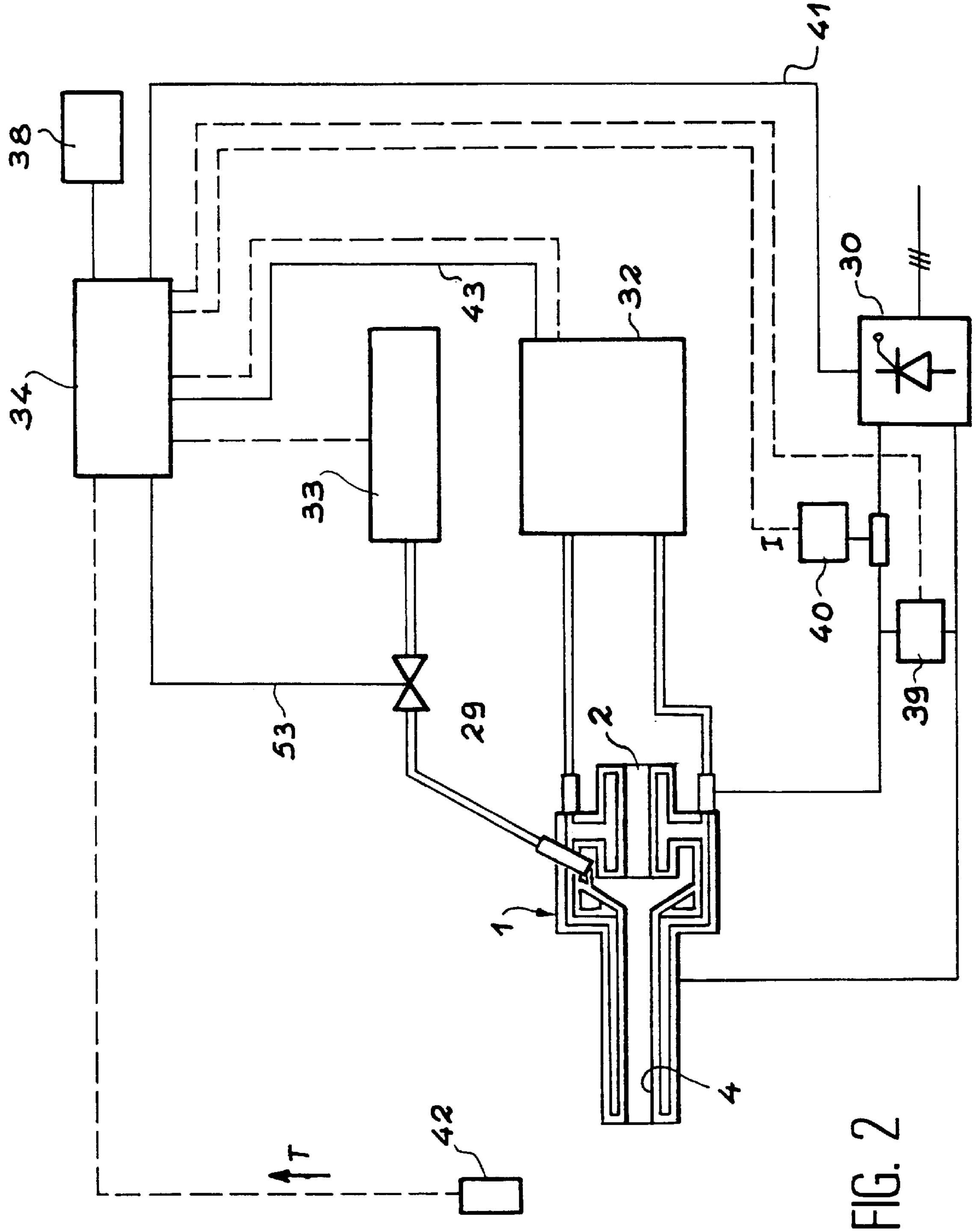
FIG. 2 Diagrammatically a torch and its fluid and electricity supply and regulating systems.

As illustrated in FIG. 2, the torch can be implemented with the assistance of the following, subsequently described subsystems:

- means 30 for the electrical supply of the torch system, controlled by checking or control means 34 (cf. hereinafter),
- fluid supply means 32, which comprise a cooling water circuit for the torch,

- a plasma-forming gas or air circuit 33,
- an oil circuit for controlling the starter 10,
- a valve 29 regulating the admission of plasma forming gas into the torch,
- an operator interface 38 (or supervising computer),
- program control means 34, e.g. a robot, for the control of the torch 1, whereby, through the process supervising computer 38, an operator can introduce into the control means 34 desired reference values, e.g. reference values for the electric power, thermal power and temperature at which a process maintained by the torch 1 takes place.

The torch regulating and control programs are loaded into the industrial robot 34, which essentially comprises a central processing unit and input/output cards. It is programmed from a personal computer (PC). To this end, e.g. the robot designer supplies a software making it possible to create a binary program in the robot. Dialogue with the robot takes place via an exchange table or memory area using a supervision device. From the outside, the supervision device (PC) supplies messages to the exchange table. The robot reads the state of the table and brings the system (e.g. a cooling circuit pump) into conformity with the memory or exchange table. The robot provided in the present invention can e.g. operate with a cycle between approximately 10 and 100 ms (reaction speed). Preferably, use is made of a rapid cycle of approximately 10 ms.

The robot 34 sends control signals by means of links 41, 43, 53. The means 34 can also integrate security devices making it possible to alert an operator and/or stop the operation of the torch if certain faults arise in the electrical supply means 30 or fluid supply means 32. As will be described hereinafter, the control of the torch incorporates a regulation of the electric power supplied thereto, whilst attempting to maintain the voltage between the electrodes at an optimum value.

To this end, sensors 39, 40 make it possible to measure the voltage and current supplied to the torch electrodes 2, 4. The quantities supplied by these sensors are digitized and make it possible to calculate the real power at which the torch operates.

In the same way, a temperature sensor 42 can be provided for measuring the temperature at which takes place a process maintained by the torch 1.

The operation of a plasma torch can be described with the aid of arc voltage curves, as a function of the arc current, for given plasma forming gas flows. A system of curves or a system of operating points is obtained, which is a function of the torch geometry, aerodynamic forces due to the vortex and magnetic forces due to the field coil. Therefore this system of operating points is unique for each torch type.

Figure 3:
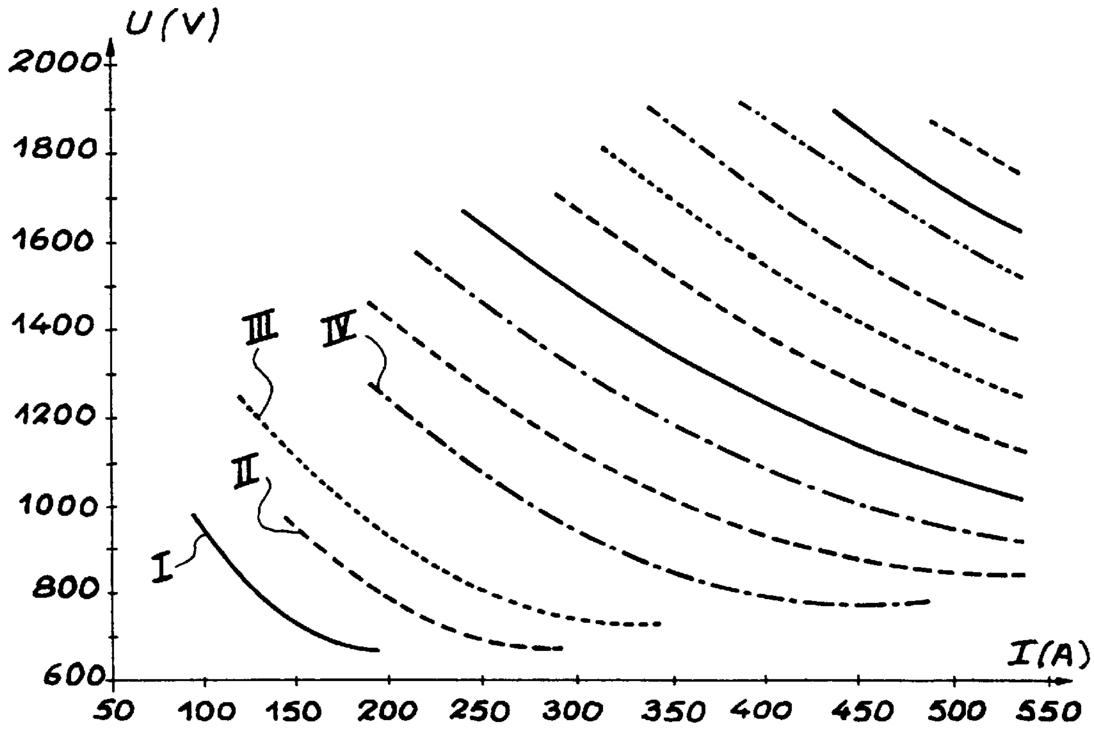
FIG. 3 An example of operating diagrams for an 800 kW plasma torch.

An example of a diagram (isoflow curves) of operating points is given in FIG. 3 for an 800 kW torch. In FIG. 3, curves I, II, III and IV respectively correspond to plasma forming gas flows of 10, 15, 20 and 30 g/s. The other curves correspond to flows increasing in each case by 10 g/s (40 g/s, 50 g/s, etc.).

Consequently, each torch type has an operating range characterized by the following, specific parameters:

- the arc current I,
- the plasma forming gas flow Q,
- the arc voltage U, which substantially expresses the arc length.

In order to bring about a control of the torch, it is consequently possible to choose one of these two parameters as the control parameter. In particular, I and Q are very suitable control parameters, the voltage U resulting from the values chosen by said parameters.

For an optimum torch operation, the value of the voltage follows a curve U=f(P), in which P is the power of the torch. Such a curve is experimentally established ensuring that the arc is not caught on the end of the torch, that the voltage does not exceed the maximum voltage permitted by the electric power supply and that the arc fills a maximum volume of the downstream electrode.

The curve $U_{optimal}$=f(P) is obtained by experimentally establishing the constant flow diagrams Q=f(I) of the type given in FIG. 3 and referred to hereinbefore. This curve is loaded into the exchange table of the robot 34.

The optimum operating point associating the arc length, efficiency and enthalpy is fixed for each power value.

With each point in question correspond a power P and a voltage U. The association of the power and voltage of selected points gives the curve $U_{optimal}$=f(P). An example of such a curve is given in FIG. 4 (curve $C_1$).

Operation along the curve $C_1$ is of an optimum nature, but other operating conditions are possible. Thus, the curve $C_1$ corresponds to the case where the torch operates with a maximum efficiency. As from a point of the curve $C_1$, a variation of the value of the voltage and/or the electric power leads to a reduction in the operating efficiency.

Figure 4:
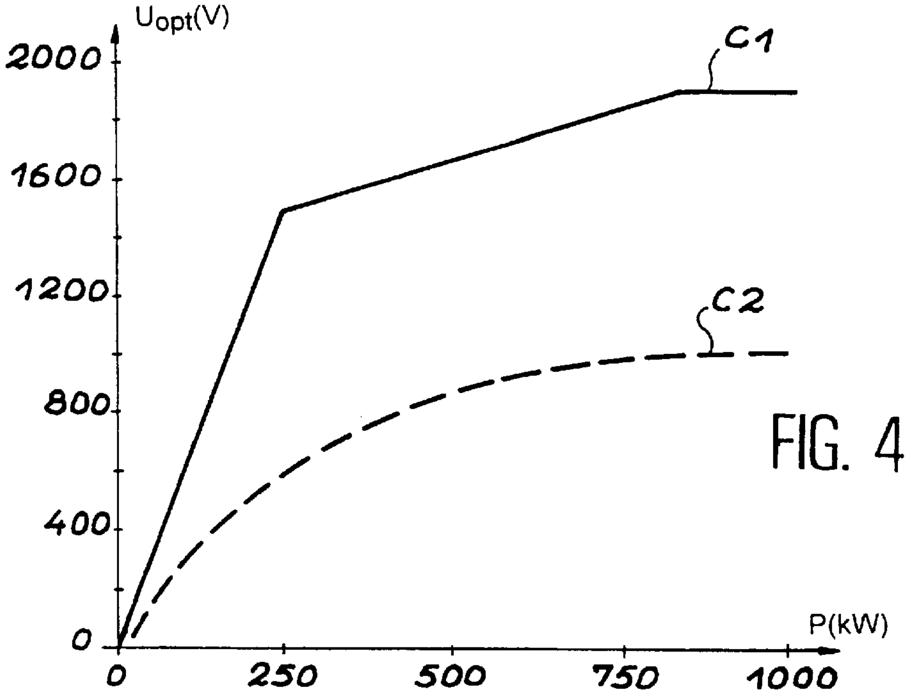
FIG. 4 An example of the evolution of the optimum voltage of a plasma torch, as a function of its power.

In FIG. 4, a second curve $C_2$ represents the lower limit of the possible torch operating area. These two curves define three areas in the plane (P, U):

- area 1, located above curve $C_1$: in this area, the arc passes out of the downstream electrode and becomes too long and operation in this area is precluded,
- area 2, located beneath the curve $C_2$: the operation of the torch is unstable, the voltage and resistivity being too low,
- area 3, located between the two curves: operation is possible with a variable efficiency, efficiency being of an optimum nature on curve $C_1$ and decreases when the operating parameters move away from the operating point of the curve $C_1$ in order to approach curve $C_2$, which then corresponds to the case where the enthalpy of the gas increases. For one reason or another, a designer can choose to make the torch operate along a curve located between $C_1$ and $C_2$. In this case, he replaces in the exchange table of the robot 34, the curve already introduced by the new curve.
- Curve $C_1$ constitutes an operating objective of the torch to be reached. To this end, a variation takes place of the arc current I and air flow Q values, so as to vary the arc voltage U. The variations of the current I and voltage U lead to variations in the power P=U.I. It can thus be said that the function $U_{optimal}$=f(P) described hereinbefore results from the transfer function of the turch U=F(I,Q). The latter translates the fact that the input variables of the torch regulating system are the current I and flow Q, the output variable being the voltage U.

The regulation of the torch is based on the following principles resulting from the analysis made hereinbefore of the characteristics of a plasma torch:

- an increase in the air flow Q leads to an increase in the voltage U and an increase in the power P, an increase in the air flow leading to a decrease in the air temperature and an increase in its resistivity,
- a reduction of the air flow Q leads to a reduction of the voltage U and a reduction of the power P,
- an increase of the arc current I leads to a decrease in the voltage U and an increase in the power P, an increase in the arc current leading to an increase in the temperature of the plasma forming gas and therefore a decrease in its resistivity, a decrease in the arc current I leads to an increase in the voltage U and a decrease in the power P.

The power regulation principle according to the invention will now be described in greater detail.

Prior to the igniting of the torch, an operator introduces into the robot 34 a reference power value CPUIS. By default, the robot 34 regulates the reference value to the same value as the preceding reference value.

Initially, the power of the torch increases until it reaches the power reference value (i.e. operation under ramp conditions). Then, the power of the torch is stabilized around the reference power (i.e. permanent conditions).

Measurements of the arc voltage U and arc current I are performed during each cycle of the regulating process with the aid of voltage 39 and current 40 measuring means (FIG. 2). These quantities make it possible to calculate the real electrical power of the torch $P_r$=U.I.

The regulation then consists of modifying the reference values of the air flow Q and arc current I so as to approach the measured value $P_r$ of CPUIS, with an optimum arc voltage ($U_{optimal}$) dependent on the real, instantaneous power $P_r$. As shown hereinbefore, the diagram $U_{optimal}$=f(P) is obtained from torch characterization tests. Thus, said diagram is previously introduced by an operator into the storage means of the robot 34.

During each regulating process cycle, the following operations are performed:

calculation of the real electric power $P_r$, determination of $U_{optimal}$, calculation of the difference between the reference power value CPUIS and $P_r$: ΔP=|CPUIS-$P_r$|, a comparison of ΔP and $\Delta P_{ra}$, in which $\Delta P_{ra}$ is a threshold previously fixed by the operator and as from which it is considered that the real power has reached the reference power value:

if $\Delta P \geqq \Delta P_{ra}$, the process remains at or passes to ramp conditions, if $\Delta P \leqq \Delta P_{ra}$, the process remains or passes to permanent conditions.

The following, other process operating stages can be provided:

the stage consisting of verifying that the air flow Q and arc current I reference values are between the limit values $Q_{max}$, $Q_{min}$ and $I_{max}$, $I_{min}$, the stage of regulating the current and flow reference values to the limit values, if they are not between the latter.

Figure 5:
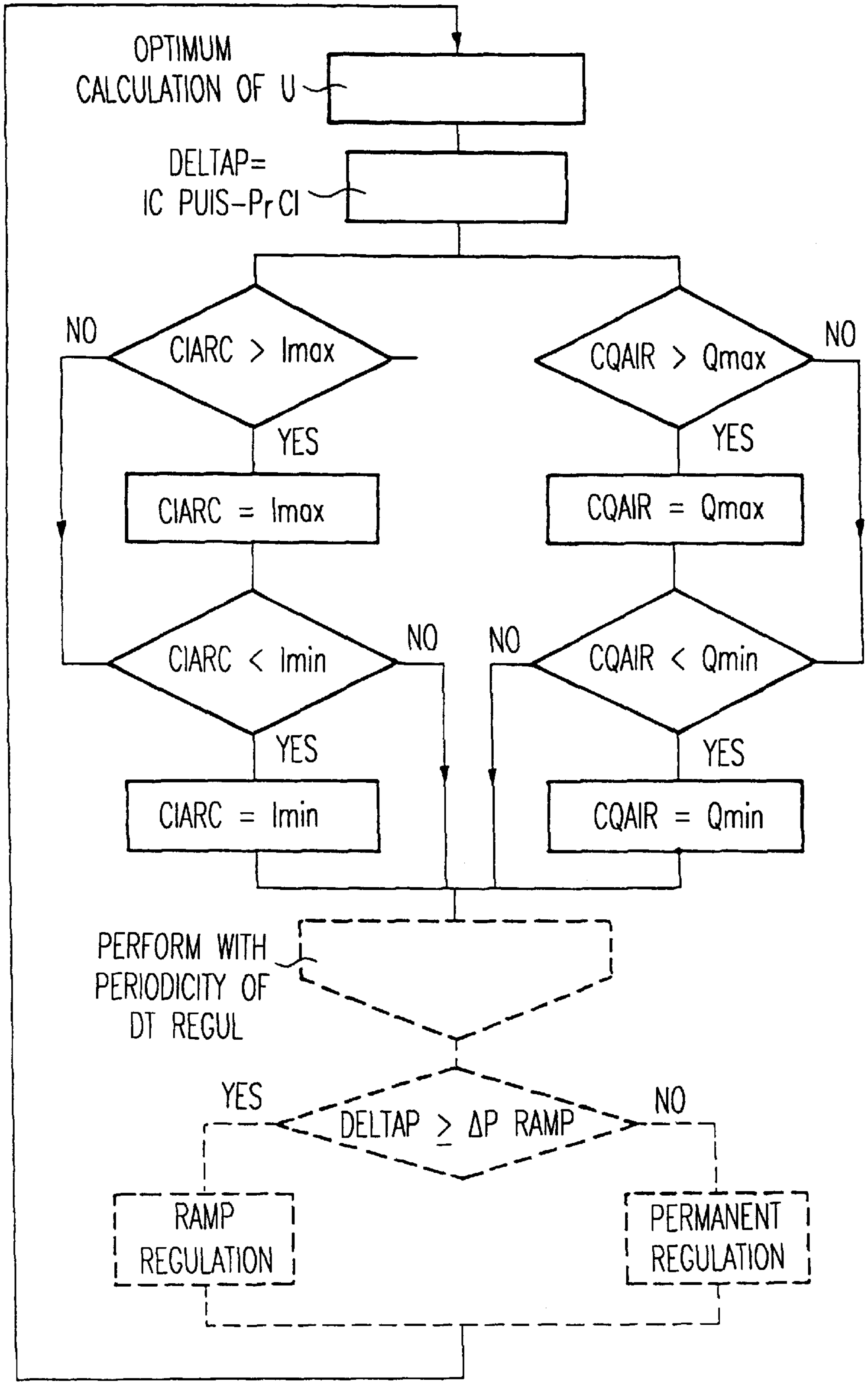
FIG. 5 Stages in a power regulating process according to the invention.

FIG. 5 is a power regulating chart according to the invention.

Figure 6:
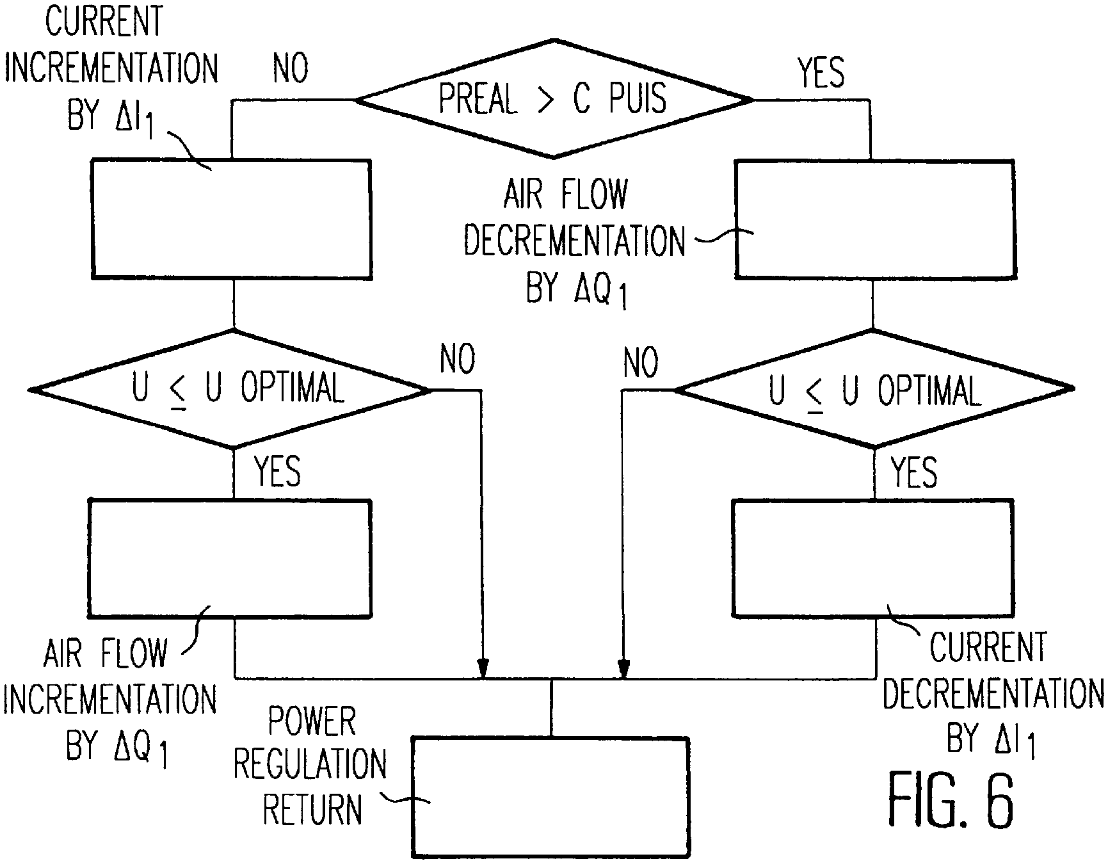
FIG. 6 Stages in a power regulating process according to the invention under ramp operating conditions.

FIG. 6 is a chart of the ramp operating conditions of the regulating process according to the invention. These conditions make it possible to rapidly reach the value CPUIS, no matter whether on starting the torch, or when the reference value CPUIS is modified during torch operation.

During these conditions, the values of Q and I are incremented (according to first incrmeents of $\Delta Q_1$ and $\Delta I_1$) with a periodicity $DT_1$, following a power rise or fall gradient.

For each time interval $DT_1$, the real power $P_r$ is measured:

if $P_r \leqq$CPUIS, the aim is to increase the torch power and it is consequently possible to increase I by $\Delta I_1$ and, if $U \leqq U_{optimal}$, it is also possible to increase Q by $\Delta Q_1$, if $P_r \geqq$CPUIS, the aim is to reduce the power of the torch and it is possible to reduce the air flow Q by $\Delta Q_1$ and, if $U \leqq U_{optimal}$, decrease the arc current I by $\Delta I_1$.

These operating conditions make it possible to increase or decrease the power of the torch, whilst remaining as close as possible to the optimum voltage $U_{optimal}$. When P drops below $\Delta P_{ra}$, ramp operating conditions are replaced by permanent operating conditions.

Permanent operating conditions consist of maintaining the real power at the reference power value when the latter is reached, with a tolerance $\Delta P_{ra}$, whilst maintaining the optimum arc voltage $U_{optimal}$. To this end, the values of the air flow Q and arc current I are incremented or decremented with increment values or steps $\Delta Q_2$, $\Delta I_2$, with a periodicity $DT_2$ (e.g. $DT_2$=$DT_1$).

With each time increment $DT_2$:

if $U<U_{optimal}$ and $P_r$<CPUIS:

if Q 21 $Q_{max}$ (maximum plasma forming gas flow): Q is incremented by $\Delta Q_2$, otherwise: I is incremented by $\Delta I_2$.

In the first case, the air flow incrementation leads to an increase in the voltage and power. In the second case, the arc current incrementation leads to a decrease in the voltage, despite the fixed objective of maintaining the voltage at an optimum value, which means that, temporarily, the process favours the power to the detriment of the voltage and therefore the power to the detriment of the efficiency. This efficiency loss is compensated during following cycles of the process.

If $U<U_{optimal}$ and $P_r$>CPUIS:

if $I>I_{min}$: the arc current is decremented by $\Delta I_2$, otherwise, the air flow Q is decremented by $\Delta Q_2$.

In the latter case the decrease in the air flow leads to a voltage and efficiency loss. However, here again, this loss is temporary and compensated during the following loops of the regulating process:

if $U \geqq U_{optimal}$ and $P_r$>CPUIS, the air flow is decremented by $\Delta Q_2$, $U \geqq U_{optimal}$ and $P_r$<CPUIS, the current is incremented by $\Delta I_2$.

Figure 7:
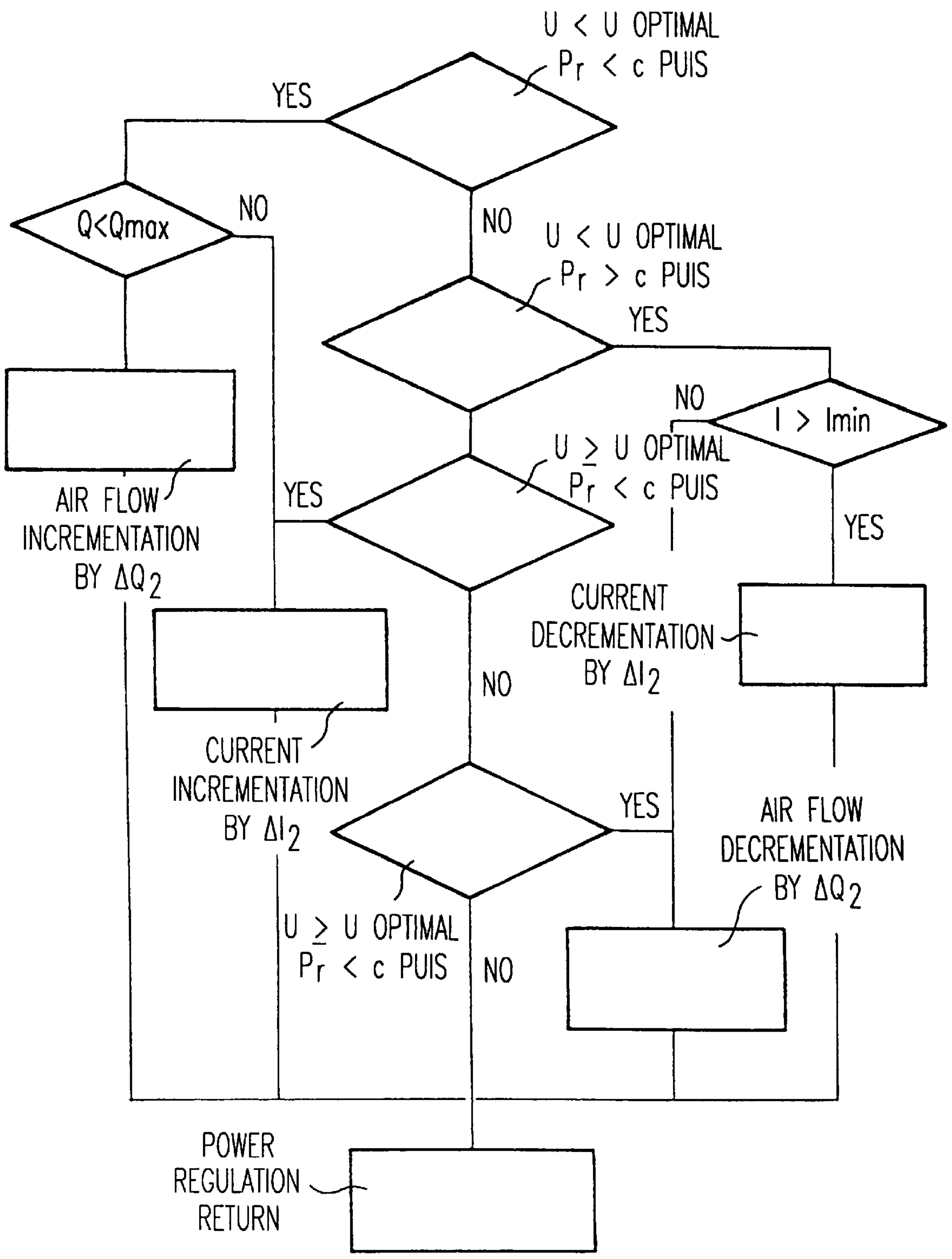
FIG. 7 Stages in a power regulating process according to the invention, under permanent operating conditions.

FIG. 7 is a chart of the permanent operating conditions of the regulating process according to the invention.

The torch regulating system remains in permanent operation for as long as there is no modification to the reference power value CPUIS. When such a modification arises, e.g. introduced by the operator into the robot 34, ΔP exceeds $\Delta P_{ra}$ and the process returns to ramp operating conditions.

Figure 8:
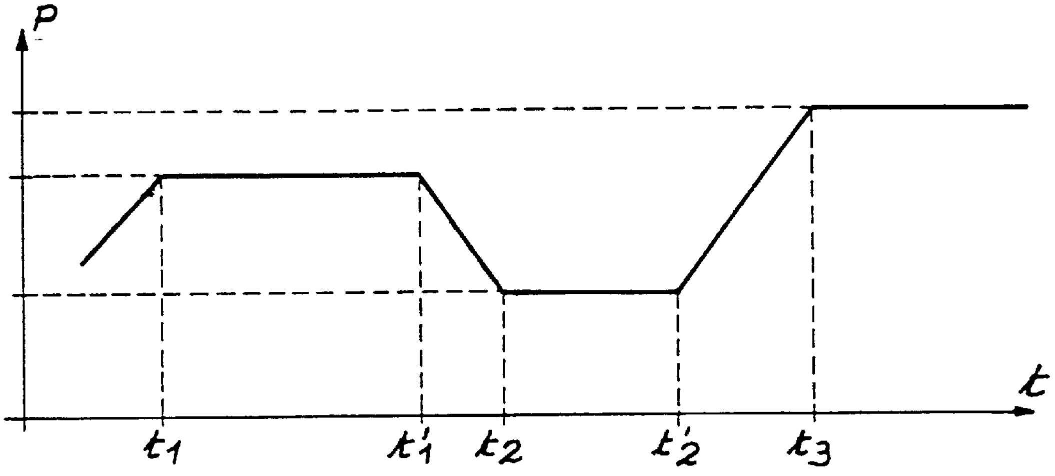
FIG. 8 The time evolution of the power of a plasma torch regulated according to the invention.

Thus, as illustrated in FIG. 8, the process according to the invention permits the evolution of the real power of the torch as a function of time, whilst remaining as close as possible to optimum operating conditions or conditions chosen by the operator. In FIG. 8, the power firstly rises according to ramp conditions and reaches a reference value $CPUIS_1$ at time $t_1$. This reference value is maintained up to time $t'_1$, where the operator modifies the reference power value to $CPUIS_2$. Operation is then once again ramp operating conditions (decreasing) to instant $t_2$. Then, between $t_2$ and $t'_2$, operation under permanent conditions makes it possible to maintain the power substantially at $CPUIS_2$. At $t_2$, a new power reference value $CPUIS_3$ is introduced by the operator. The process then again passes into ramp conditions to reach said new reference value up to time $t_3$. As from $t_3$, the torch again operates under permanent conditions. Such an operation can be continued for as long as is necessary.

The aforementioned, torch regulation process makes the power of the torch quasi-independent of internal or external factors (disturbances) able to influence the control parameters I and Q. The wear state of the electrodes, the pressure of the plasma forming gas and its composition are parameters liable to vary during the operation of the torch and which could consequently influence its performance characteristics and lead to a modification to the power supplied.

The regulating system according to the invention makes it possible to avoid this problem. For example, if the humidity of the plasma forming gas increases, this leads to a reduction in the voltage between the electrodes (the gas resistivity decreases). According to the process described hereinbefore, this leads to a decrease in the current and/or an increase in the flow, which tend to bring the voltage towards its optimum value. Thus, there is an automatic compensation of the influence of humidity. This also applies with respect to the influence of other disturbance factors.

Thus, the torch control system according to the invention has:

- means for storing a torch arc voltage curve, known as the optimum voltage curve, as a function of the real electrical power supplied to the torch,
- means for controlling a regulation of the torch power and operating:
  - according to first or ramp operating conditions, so that the real power reaches a power reference value, with an arc voltage equal to the optimum voltage,
  - according to second, permanent operating conditions, in order to stabilize the real power around the reference value, with an arc voltage equal to the optimum voltage.

The power regulation process described hereinbefore only involves the actual torch. Such a process does not take account of the environment in which the torch is operating. However, the torch operates in an apparatus or environment to which it supplies energy, said apparatus or environment having to be raised to a given temperature, which is e.g. constant or cyclic. The heat input or supply necessary for maintaining the temperature can also vary as a function of the state in which the apparatus or environment is located. If e.g. the torch is used with or in a furnace, it may be necessary to vary the heat supply during the furnace loading phases, or furnace temperature homogenization phases.

In addition to the power regulation system described hereinbefore, the invention makes it possible to regulate the temperature of the environment in which the torch is placed. This temperature regulation, based on the modulation of the power of the torch, is implemented in order to bring the environment to a reference temperature value $CT_f$ and maintain it at said temperature. This temperature regulation is a second level regulation, which is superimposed on the still active, power regulation.

The temperature regulation parameters are as follows:

The final temperature reference value $CT_f$.

The temperature rise or fall gradient $C_P=\Delta T/\Delta t$: which translates the fact that the temperature of the environment of the torch varies with a limited speed. Thus, this quantity $C_P$ has to be experimentally determined and results directly from the furnace transfer function. Through the knowledge of the environment, the way in which it has to function and characterization tests, it is possible to obtain information on the values which can be given to $C_P$, as a function of the power of the torch. If $C_P$ has an excessive value, the power of the torch reaches its maximum value too rapidly, without the temperature rise gradient of the environment being respected. If the value of $C_P$ is too low, the torch remains at an inadequate power level.

The temperature regulation consists of incrementing or decrementing the torch power a certain number of times by ΔP, in order to reach the final temperature of the furnace $CT_f$, whilst respecting the gradient $C_P$.

During each cycle of the temperature regulation process according to the invention, the temperature of the environment is measured (with the aid of the temperature sensor 42 in FIG. 2). This value $T_m$ is stored, as is the value of the temperature $T_{m-1}$ of the preceding cycle.

The robot also knows the initial temperature value $T_0$ (temperature at the start of regulation) and can calculate the instantaneous reference temperature value $T_c$: $T_c=T_0\pm C_P\times\Delta T$, in which ΔT is the time increment (or time step) of the cycle.

Thus, for each cycle, the instantaneous reference temperature value $T_c$, the real temperature $T_m$ and the real gradient $PEN_r=(T_m-T_{m-1})/\Delta T$ are available. The latter quantity is the effective temperature rise or fall gradient in the furnace in ° C./h for the cycle m.

Thus, ΔT is the temperature variation tolerance between $T_c$ and $T_m$ and ΔPE is the gradient variation tolerance between the real gradient $PEN_r$ and $C_p$, so that:

if $T_m<T_c-\Delta T$: the power is incremented by 2 ΔP, if $T_m>T_c+\Delta T$: the power is decremented by 2 ΔP, if $PEN_r<C_P-\Delta PE$: the power is incremented by ΔP, if $PEN_r>C_P+\Delta PE$: the power is decremented by ΔP.

Figure 9:
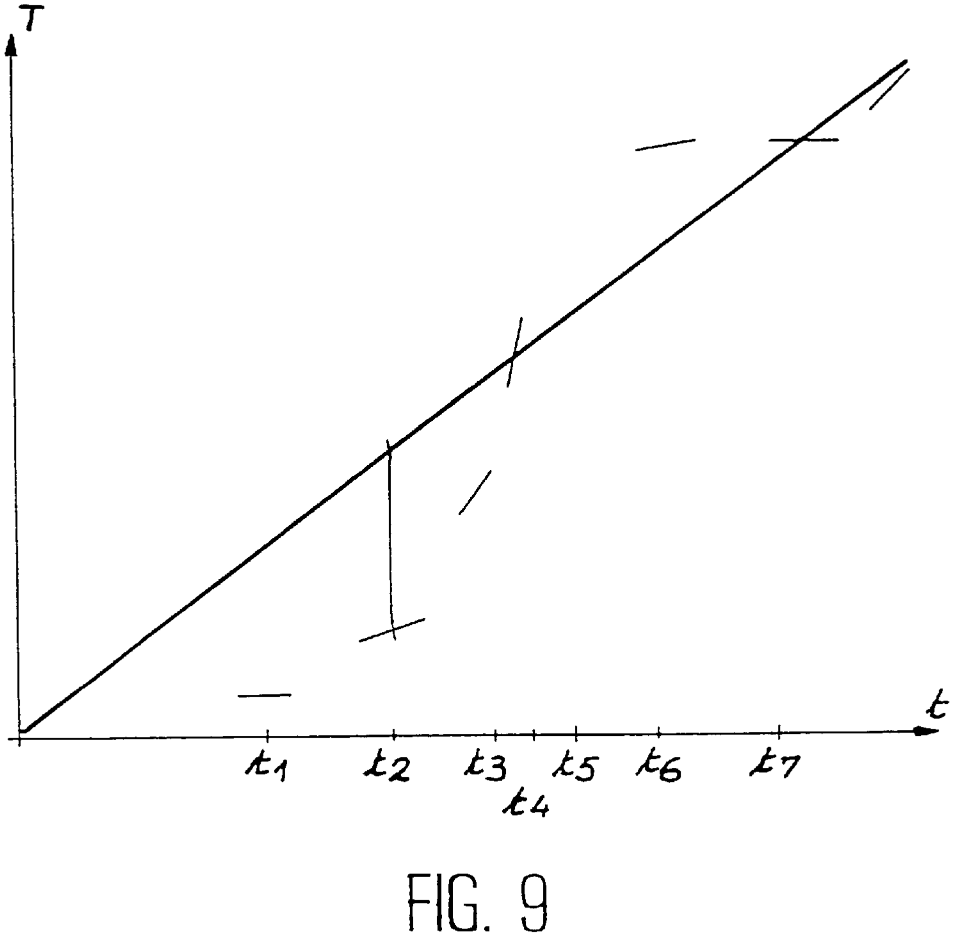
FIG. 9 The time evolution of the reference temperature and the temperature of a device in which the torch is used.

For such a temperature regulation process, the evolution of the temperature as a function of time is diagrammatically represented in FIG. 9. The gradient line $C_P$ represents the evolution of the reference temperature value of the environment. Around each of the instants $t_1, t_2, \ldots t_7$, the real temperature and real temperature gradient are respectively measured and calculated. For each of these instants, the corresponding power increment or decrement value is plotted on the graph. Thus, around the instant $t_1$, the temperature variation compared with the instantaneous reference value, exceeds ΔT, which leads to a power increment of 2 ΔP. The variation between the real gradient and $C_p$ results in a power incrementation of ΔP, hence a total power incrementation of 3 ΔP.

Figure 10:
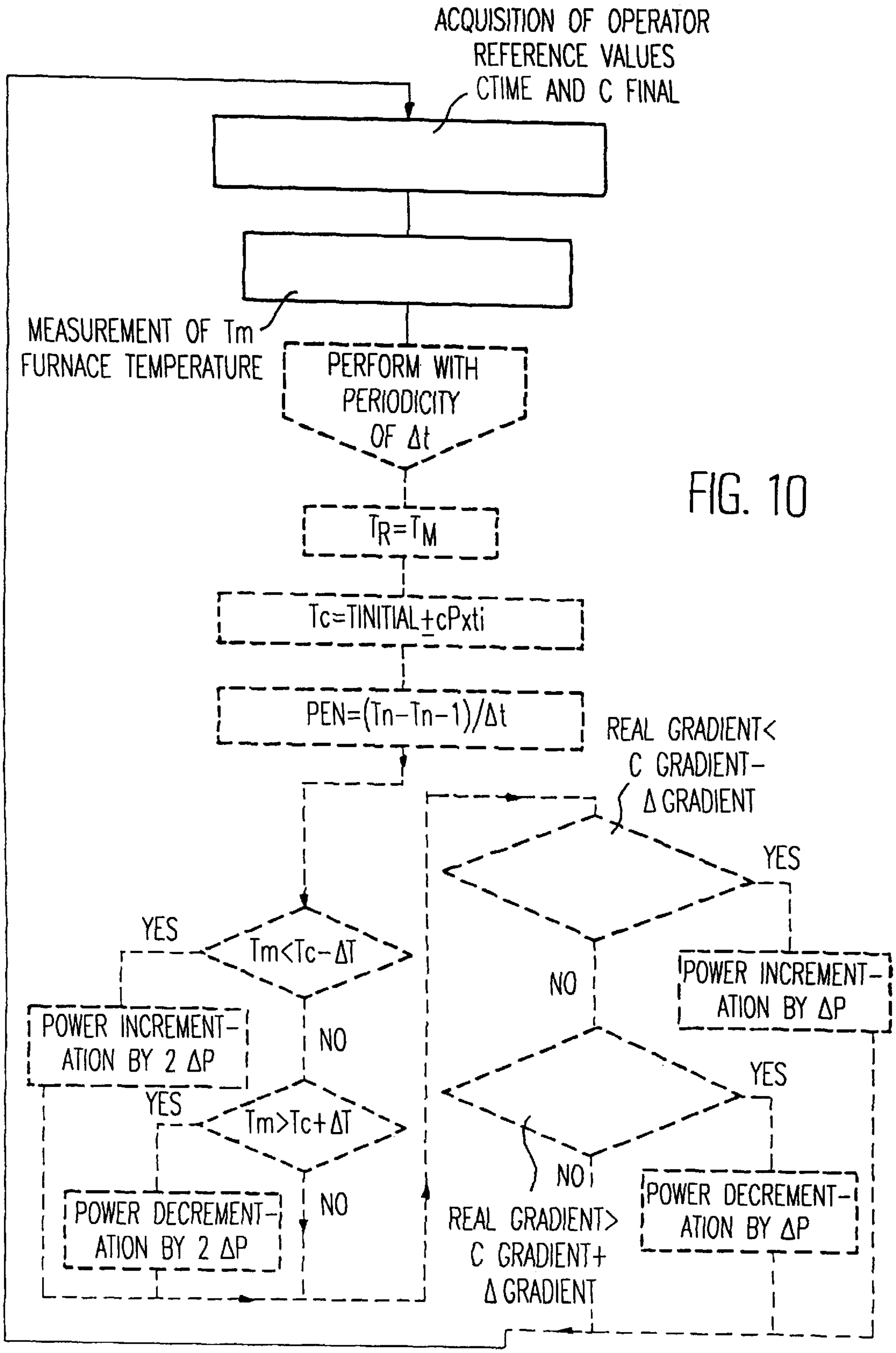
FIG. 10 Stages of a temperature regulating process according to the invention.

FIG. 10 is a chart diagrammatically representing the succession of stages of the temperature regulation process according to the present invention. For example, $T_m$ is measured with a periodicity of 60 seconds. It is also possible to choose to give to the parameters the following values by default:

- $CT_f$: same value as the preceding reference value,
- $C_P$: same value as the preceding reference value,
- P, ΔT, ΔPE: values given according to characteristics of the assembly constituted by the torch and its environment (e.g. the torch and the furnace),
- $CT_I$ (initial temperature reference value) and $C_P$ are initial values which can be found by the operator on requesting an initialization.

Two complimentary aspects of a torch regulation process have been described hereinbefore, namely the power regulation and temperature regulation. The temperature regulation makes use of the power regulation. However, in certain applications, a power regulation can take place without any temperature regulation. When both are used, there is a double regulation of the system constituted by the plasma torch.

Figure 11:
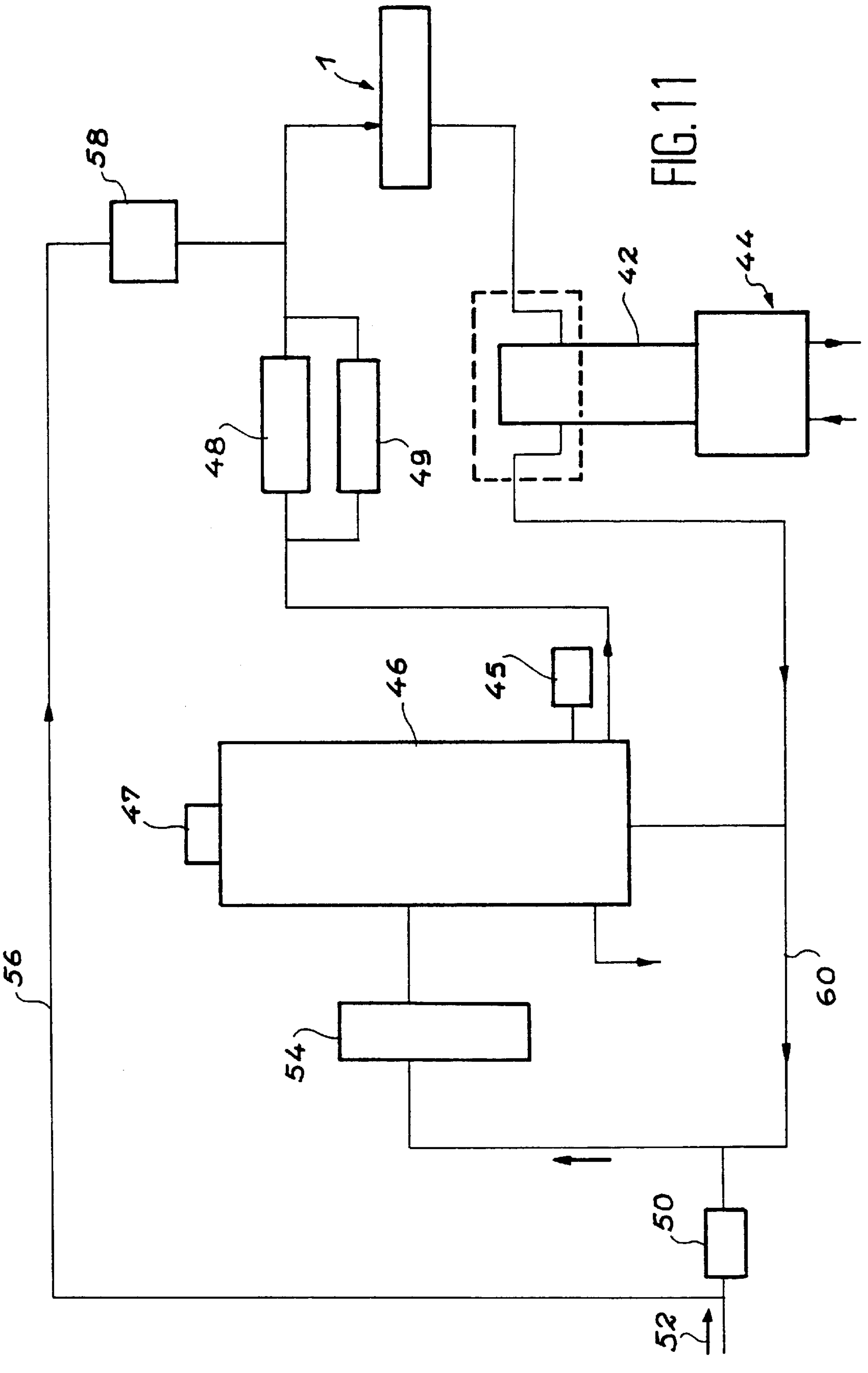
FIG. 11 Diagrammatically a cooling circuit for a torch system according to the invention.

The means 32 for supplying the torch with fluid will now be described. FIG. 11 is a torch cooling circuit diagram 32.

The plasma torch is permanently cooled by a pressurized, demineralized water circulation, in its internal part, around the upstream and downstream electrodes, around the field coil and in its external part, around the external, downstream envelope. This cooling water circulation in the torch is provided by a pump 48 and makes it possible to evacuate the energy transmitted to the walls by the electrical arc, as well as by the temperature of the apparatus or environment in which the downstream end of the torch is located.

The torch cooling water is demineralized in order to guarantee the electrical insulation of the various live components of the torch. Preferably, the resistivity of the water is permanently controlled with the aid of a resistivity sensor connected to the robot 34 (FIG. 2). The automatic regeneration of part of the water circulating in the torch keeps the resistivity above a minimum threshold.

A solenoid valve 50 controls the admission of water 52 into the demineralized water circuit constituted by demineralization cartridges 54 and the tank 46.

A demineralization water recycling circuit 60 makes it possible to maintain the quality of the demineralized water passing into the torch. This circuit, branched on the tank, passes part of the water into demineralization resin cartridges 54 and reinjects it into the tank 46, when the water circulation in the torch is activated. Thus, demineralization automatically takes place by a permanent branching of the water circuit and without any intervention of the robot. The recycling flow regulation takes place manually by a valve.

A pressure sensor 47 makes it possible to monitor the pressurization of the cooling circuit. If the pressure drops below a deficiency threshold, the torch is electrically stopped.

The filling cycle for the tank 46 makes it possible to obtain permanently a demineralized water reserve adequate to ensure an optimum cooling of the operating torch. It is automatically actuated or activated as a result of a water pressure drop (given by the tank pressure sensor), when it reaches the minimum threshold and stops when the maximum threshold is reached. The different thresholds are detected by comparison between the identical pressure measurement and threshold stored in the robot. It is the latter which then controls the opening of the valve 50.

A level sensor 45 brings about the stopping of the cooling pump in the case of a significant leak, so as to ensure that the pump does not operate dry.

The evacuation of the energy intercepted by the cooling circuit is ensured by an exchanger 42 (plate exchanger) in conjunction with a secondary water circuit 44. The latter can incorporate an aerocoolant operating on the evaporation principle and can form a closed loop or, more simply, can be in open loop with a continuous waste water flow, as a function of what is available or the choice of the installation site of the apparatus.

A circuit 56, incorporating a valve 58, can be provided for ensuring standby or emergency cooling. It is e.g. connected to the mains and thus supplies non-demineralized water to the torch 1, which pollutes the water circuit. The device only operates when the pumps are stopped and the torch is still in the apparatus where it is operating.

Various monitoring functions can optionally be provided in addition to the aforementioned circuit, either together or separately:

- a monitoring of tank filling: if the filling duration is too long, or if the time between two fillings is too long, the robot 34 can send a message to the operator or emit an alarm signal,
- a monitoring the demineralization: means can be provided, in combination with the tank 46 or circuit 60, for measuring the resistivity of the demineralized water, a signal then being sent to the robot 34, where the measured resistivity is compared with one or more threshold values, a deficiency threshold and an alarm threshold being providable, for which:
  - if the measured resistivity is below the deficiency threshold, the torch is electrically stopped and an alarm is emitted,
  - if the measured resistivity is below the alarm threshold, an alarm is emitted,
- a monitoring of the water circulation: sensors make it possible to measure the water flow in the torch and/or the water level in the tank and/or the water pressure in said circuit and/or the temperatures of the water on entering and leaving the torch.

For the flow, pressure and temperatures, alarm and/or deficiency thresholds can be provided, with which the robot compares the measured values. The passing beyond the alarm threshold leads to the emission of an alarm signal, whilst passing beyond the deficiency threshold leads to the stopping of the torch. For the water level, the passing beneath a very low level leads to the stopping of the pumps and the torch, with a monitoring the pump 48 and when the latter is stooped and the torch is in position on a utilization site, a standby pump 49 is put into operation under the control of the robot 34. Thus, the robot 34 can ensure the monitoring and control of the following functions:

- filling the hydraulic circuit and raw water top-up,
- demineralization recycling of the cooling water,
- water circulation in the torch,
- standby cooling,
- optionally, cooling of the water.

The protection, in the case of an electrical cut-out or stoppage of the pumps, can be ensured:

- by automatic moving back of the torch,
- by the standby circuit 56 if the torch recoil is not validated,
- by sending to the operator a severe damage information, if the water flow is still inadequate and torch recoil has not been validated.

An operating security means can consequently make it possible to ensure that the following rules are respected:

- the cooling of the torch is ensured when it is operating and when in the apparatus (otherwise very rapid melting of the electrodes and its downstream part would occur);
- in the case of a cooling loss, when the torch is in the apparatus, emergency actions are provided and generated by the control/checking checking means 34, as a function of the configuration of the installation and the type involved:
  1. automatic starting up of an emergency pump,
  2. automatic recoil of the torch,
  3. raw, standby water circulation.

The operating parameters (pressure, flow rate, water temperature, resistivity) can be permanently measured and, in the case of a variation in one of them, the operator can be alerted before any need for security measures arises.

Figure 12:
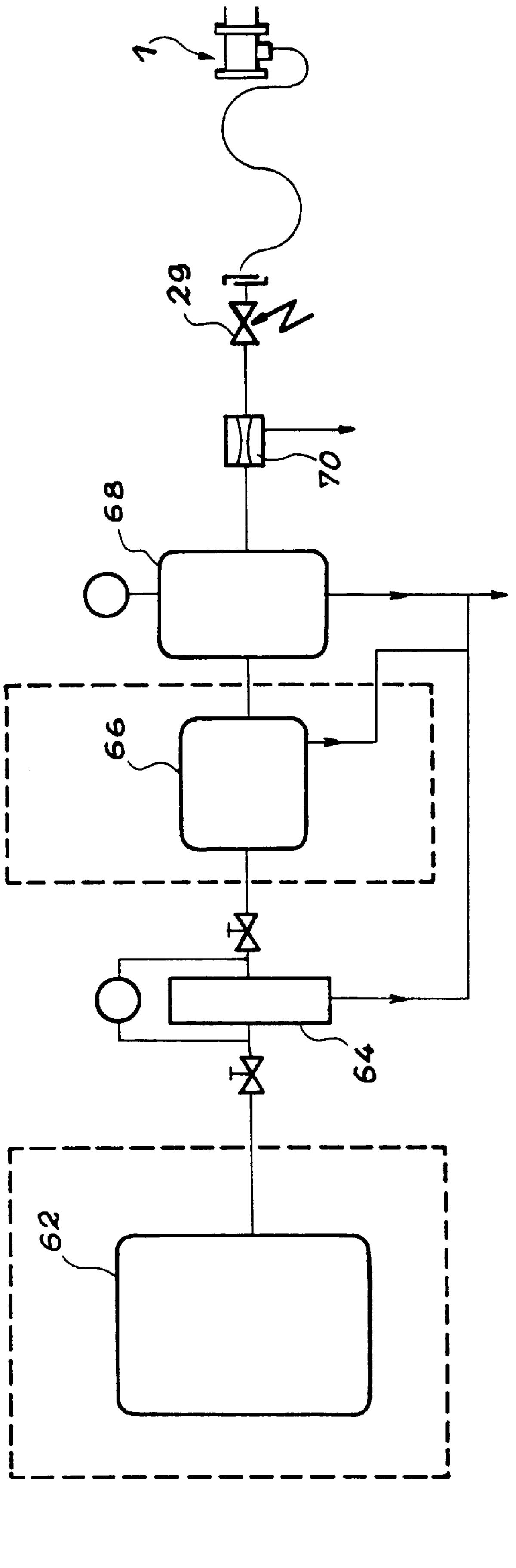
FIG. 12 Diagrammatically a plasma forming gas supply circuit of a torch system according to the invention.

The means for generating and controlling the plasma forming gas flow supplied to the torch will now be described in conjunction with FIG. 12. The plasma forming gas can be air from an industrial air system or a compressor. The minimum pressure available is preferably approximately 6 bars and the flow rate 300 $Nm^3/h$, i.e. approximately 110 g/s, at a power of 800 kW.

At the outlet from the compressor 62, the air is deoiled, dried and filtered to approximately 1/10 micrometer, using filtering means 64 and a drying device 66. A buffer tank 68 creates an air reserve and prevents pressure fluctuations caused by the compressor upstream of the regulating valve 29.

A flowmeter 70 measures the air flow supplied to the torch 1, said flow being controlled by the control valve, or regulating valve 29 (cf. FIG. 2). Preferably, the robot 34 ensures the starting up and stopping of the drying device, the compressor and the opening and closing of the regulating valve 29. As soon as the torch is no longer in the retracted position with respect to its place of use, a minimum air flow is fed into the torch so as to prevent any internal pollution.

The flowmeter 70 supplies a flow measurement value which can be compared, in the robot 34, with one or more threshold values, e.g. an alarm and/or deficiency threshold value. On passing beyond the alarm threshold value, a warning signal is sent to the operator.

The passing beyond the deficiency threshold value leads to the stopping of the torch the drier and the compressor. The valve 29 is also closed, except for the case when the torch is still at its place of use, when a minimum air circulation value is maintained, which prevents any pollution of the torch by the environment.

The information relating to the air flow value can also play a part, as has been explained hereinbefore, in the framework of torch power regulation. The regulation provided within the present invention has the advantage of an external disturbance with respect to the air circuit (e.g. a variation in atmospheric humidity, or a variation in the air pressure) does not lead to the stoppage of the torch. The operator can be warned, but the regulating device according to the invention makes it possible to react to and compensate external disturbances with respect to the air flow. Conversely, the gas flow is controlled as a function of the power or, optionally, the requested gas enthalpy, before being injected into the torch.

The torch starting device or starter will now be described in conjunction with FIG. 13, where it is designated by the reference 71.

It is pointed out that such a starter is described in FR-89 14677. The starter makes it possible to maintain under pressure the jack hydraulic activation circuit. It also controls the forward and return movement of the starting jack 2 (FIG. 1). It is the device ensuring the ignition in the arc in the torch. Prior to ignition, it is in the advanced position, the upstream electrode being in contact with the downstream electrode and effecting a short-circuit. On starting, during the establishment of the arc current, the said jack rapidly moves back the upstream electrode and "draws" the arc between the two electrodes.

Figure 13:
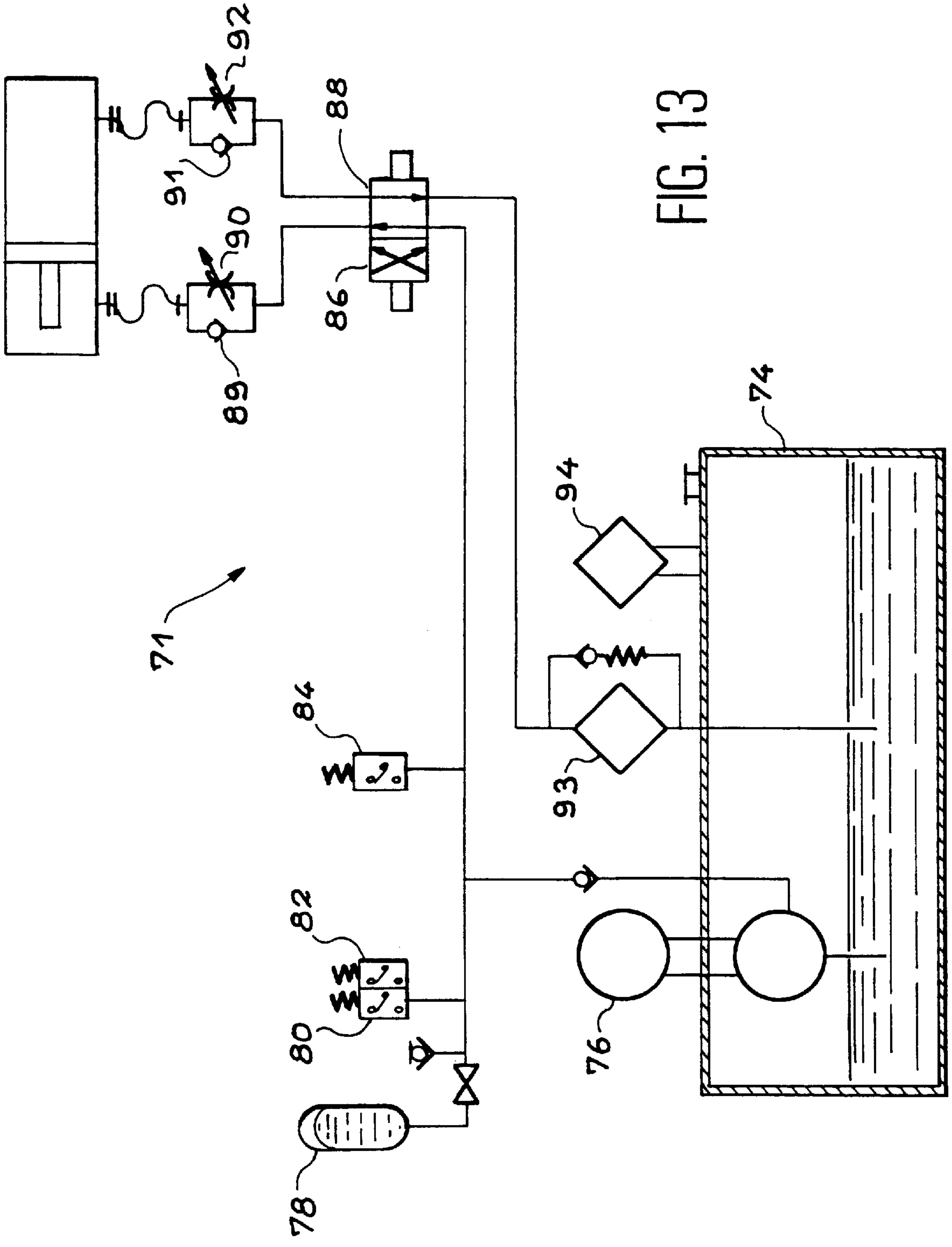
FIG. 13 Diagrammatically a hydraulic circuit of the plasma torch starter.

In FIG. 13, reference numeral 74 designates a tank containing the hydraulic circuit oil. A pump 76 raises part of the oil into a double accumulator 78, the upper part thereof containing the air. When the pressure rises in the accumulator and reaches a limit value, the pressostat 80 cuts out the pump motor 76. The pressostat 82 restarts the pump when the oil pressure reaches a low limit. A pressure deficiency pressostat 84 prevents the starting of the torch if the oil pressure is not adequate.

A distributor 87 has a part 86 associated with the starter advance function and a part 88 associated with the starter recoil function. In FIG. 12, the distributor is in the starter recoil position, so that the oil pressure is directed towards the rear of the jack.

With each of the compartments of the starter jack is then associated a flow limiter 89-90, 91-92. Each incorporates a check valve 89, 91 and a flow limiter 90, 92. The limiters are mechanical regulating systems enabling the oil to pass to and return from the jack. The return of the oil into the tank takes place by means of an oil filter 93 (10 $\mu$m filter). Finally, the tank 74 is equipped with an air filter 94.

Figure 14:
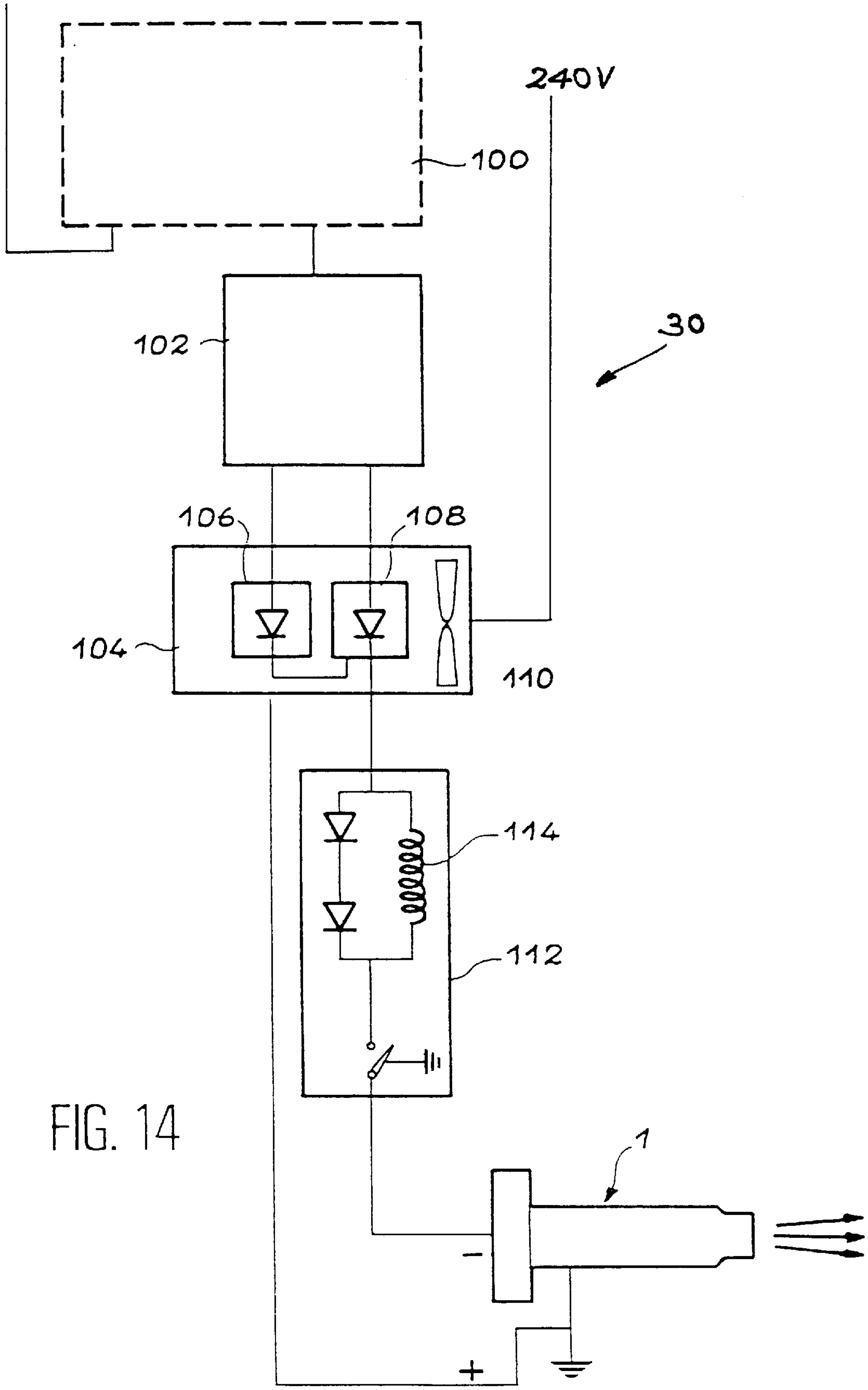
FIG. 14 Diagrammatically an electrical supply circuit of a torch system according to the invention.

The electric power supply means ensure the supply of the field coil 8 (FIG. 1) and the arc 18 (FIG. 1), disposed either in series or in separate form, from a high voltage system. The electric supply means 30 are diagrammatically shown in FIG. 14 and comprise a high voltage supply 100, a transformer 102 (generally dodecaphase) and a rectifier 104. They provide a direct current supply to the torch electrodes and the field coil. A smoothing choke 114 of an overvoltage means 112 absorbs the current fluctuations of the arc.

The arc rectifier 104 is essentially constituted by Graetz bridges (e.g. 6 thyristors per bridge). Fan-type means 110 ensure an adequate air circulation in the rectifier 104. The latter is programmed by a reference current value $I_{arc}$ supplied from the robot 34. The preparation of this reference value was described hereinbefore in conjunction with the torch power regulation process.

The monitoring of faults in the current supply means is centralized with respect to the rectifiers 104. The transmission of information concerning the faults takes place directly to the robot 34. Standard sensors make it possible to measure arc current and arc voltage values in the torch 1.

With the arc currents can be associated alarm and deficiency thresholds (e.g. 50 A for the alarm threshold and 100 A for the deficiency threshold). In the first case, the exceeding of said threshold leads to the emission of an arc current alarm signal and in the second to the stopping of the torch.

For the arc voltage, three thresholds can be provided: a minimum threshold below which the voltage is too low, an alarm threshold and a deficiency threshold. When the voltage drops below the minimum threshold or exceeds the alarm threshold, a corresponding alarm signal is sent by the robot 34. When the voltage exceeds the deficiency threshold, the torch 1 is stopped.

The regulation system according to the invention is a system having two nested loops, the first loop relating to the power regulation and the second loop to the temperature regulation. The servo-mechanism of the torch system is diagrammatically shown in FIG. 15.

The left-hand column contains reference values T (temperature of the apparatus or environment of the torch), P (in kW, electrical power supplied to the torch), I (in A, current) and Q (in $Nm^3/h$, plasma forming gas flow rate).

A manual reference value 120 enables the operator to solely select the power regulation function. Moreover, a reference value 122 makes it possible to bring the power to a minium value $P_{mini}$, e.g. in the case where the torch is used in a furnace and where the latter is under an overpressure.

Figure 15:
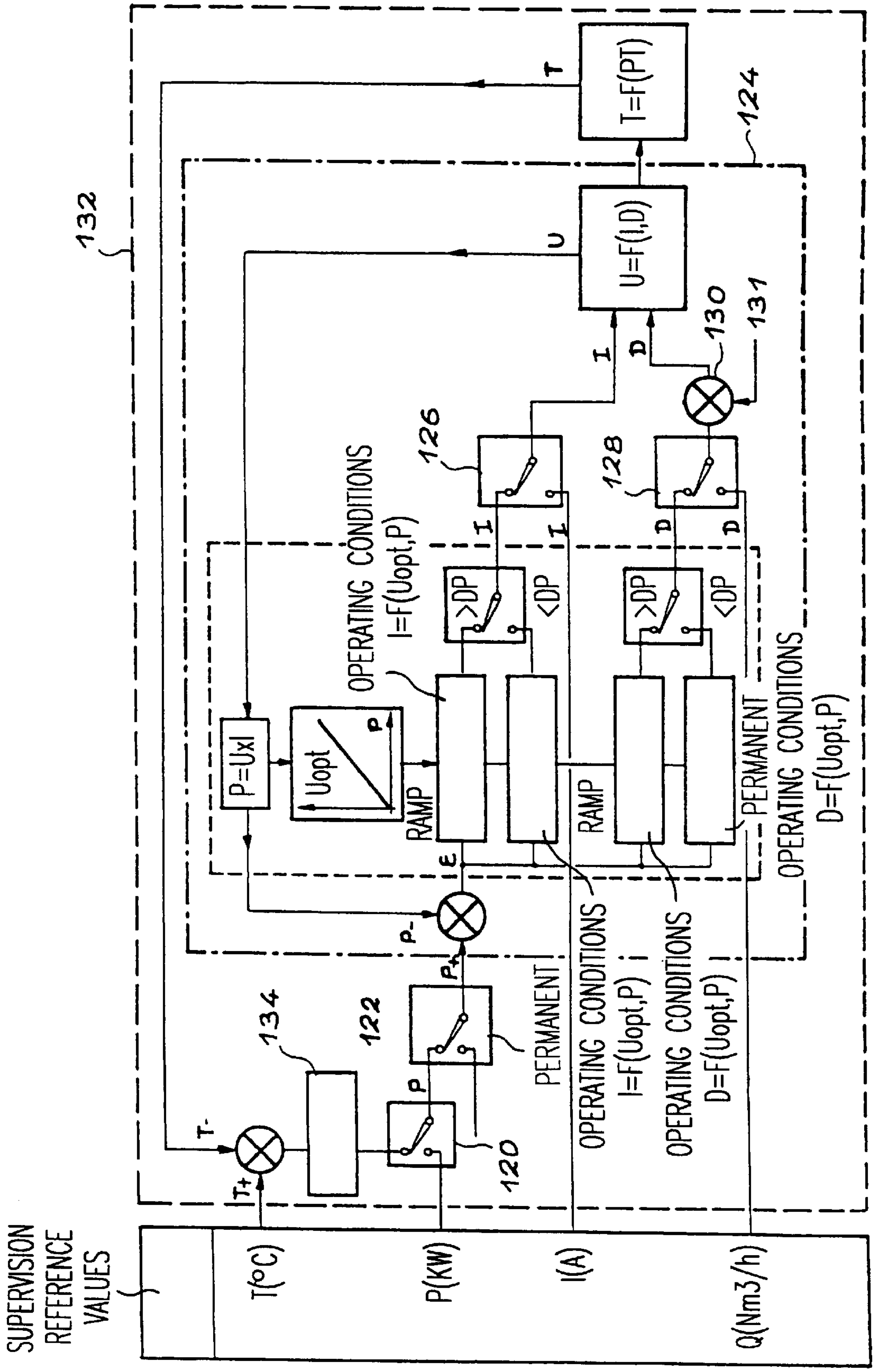
FIG. 15 A servo-mechanism of a torch system according to the invention.

Power regulation then takes place in the manner described hereinbefore (block 124 in FIG. 15). It should be noted that the reference values 126, 128 can also be provided for blocking the current I and flow Q at their fixed reference value (in which case there is no longer a power regulation). Disturbances 131, e.g. to the air flow, are taken into account. The function F represents the torch transfer function.

The temperature regulation takes place in the manner described hereinbefore (block 132 in FIG. 15). A variation $\epsilon$ between the measured temperature and the reference temperature leads to an evolution of the reference power value in accordance with P=g(T) (block 134). The function G (T=G(P)) represents the transfer function of the torch and furnace.

Finally, the process can authorize or prevent the operation of the torch system in accordance with the state of the different ancillary systems (plasma forming gas supply, cooling circuit, etc.), as described hereinbefore.

In general terms, the invention is particularly appropriate for the regulation and/or control of a plasma torch with a power exceeding 100 kW, e.g. a power of 800 kW, or 2 MW or 4 MW.

We claim:

1. A plasma torch control system comprising:

a data storage device configured to store optimum arc voltages as a function of real torch powers supplied to the torch, wherein an optimum arc voltage is a voltage for which the torch has maximum torch efficiency for a real torch power;

a ramping regulator configured to ramp the real torch power to a power reference value and configured to keep a real arc voltage of the torch within an error margin of an optimum arc voltage stored in the data storage device;

a stabilizing regulator configured to stabilize the real torch power around the power reference value and configured to keep the real arc voltage within an error margin of an optimum arc voltage stored in the data storage device;

a fluid supply mechanism configured to supply fluid to the torch;

an electric power supply device configured to supply electric power to the torch; and an alarm signal generator configured to generate an alarm signal to an operator interface when faults occur to one of said fluid supply mechanism and said electric power supply device, wherein said fluid supply mechanism comprises:

a starting jack fluid supply mechanism configured to supply fluid to a starting jack in the torch; and a monitor configured to monitor a pressure of the fluid supplied to the starting jack.

2. A plasma torch control system according to claim 1, further comprising a selecting device configured to select the ramping regulator and the stabilizing regulator based on a difference between the real torch power and the power reference value.

3. A plasma torch control system according to claims 1 or 2, wherein the ramping regulator and the stabilizing regulator comprise a signal generator configured to generate a signal capable of modifying at least one of an arc current and an air flow, thereby modifying the real torch power and the real arc voltage.

4. A plasma torch control system according to claims 1 or 2, further comprising a reference power value modifier configured to modify the reference power value when the stabilizing regulator is stabilizing the real torch power.

5. A plasma torch control system according to claims 1 or 2, further comprising a temperature regulator configured to regulate a temperature of an apparatus receiving heat energy from the torch.

6. A plasma torch control system according to claim 5, wherein the temperature regulator comprises the ramping generator and the stabilizing generator.

7. A plasma torch control system according to claim 5, wherein the temperature regulator is configured to regulate the real torch power.

8. A plasma torch control system according to claim 5, wherein the temperature regulator is configured to regulate the real torch power as a function of the temperature of the apparatus and as a function of an inertia of the apparatus.

9. A plasma torch control system according to claim 5, wherein the temperature regulator is configured to regulate the real torch power as a function of:

(1) a difference between the temperature of the apparatus and a reference temperature, and (2) a difference between a rate of change of the temperature of the apparatus and an inertia of the apparatus.

10. A plasma torch control system according to claims 1 or 2, further comprising a signal generator configured to generate a signal which stops operation of the torch when faults occur to one of said fluid supply mechanism and said electric power supply device.

11. A plasma torch control system according to claim 1, wherein the fluid supply mechanism comprises at least one of:

a cooling fluid circulating mechanism, a plasma forming gas circulating mechanism, and a starting jack fluid mechanism.

12. A plasma torch control system according to claim 1, wherein the fluid supply mechanism comprises:

a demineralizer configured to demineralize a cooling fluid; and at least one of:

a demineralization monitor configured to monitor the demineralization of the cooling fluid, a flow monitor configured to monitor the cooling fluid flow in the torch, a fluid pressure monitor configured to monitor the cooling fluid pressure in the fluid supply mechanism, and a fluid temperature monitor configured to monitor the temperature of the cooling fluid entering and leaving the torch.

13. A plasma torch control system according to claim 1, wherein the fluid supply mechanism comprises:

a plasma forming gas circulating mechanism configured to circulate a plasma forming gas in the torch; and a monitor configured to monitor a plasma forming gas flow supplied to the torch.

14. A plasma torch control system according to claim 1, further comprising:

a current monitor configured to monitor a current supplied by the electric power supply device, and a voltage monitor configured to monitor a voltage supplied by the electric power supply device.

* * * * *